United States Patent [19]
Kirk

[11] 3,785,403
[45] Jan. 15, 1974

[54] FLUID LOGIC CIRCUIT

[75] Inventor: Colin John Kirk, Crowthorne, England

[73] Assignee: Martonair Limited, Middlesex, England

[22] Filed: Mar. 13, 1972

[21] Appl. No.: 233,919

[30] Foreign Application Priority Data
May 13, 1971 Great Britain................... 14,747/71

[52] U.S. Cl............. 137/608, 137/625.49, 137/829, 235/201 ME
[51] Int. Cl............................ F15c 3/04, F17d 1/00
[58] Field of Search............................ 235/201 ME; 137/81.5, 608, 625.48, 625.49, 625.4

[56] References Cited
UNITED STATES PATENTS

| 3,318,329 | 5/1967 | Norwood | 235/201 ME |
|---|---|---|---|
| 3,550,847 | 12/1970 | Scott | 235/201 ME |
| 3,552,436 | 1/1971 | Stewart | 137/608 |
| 3,433,257 | 3/1969 | Jensen | 235/201 ME |
| 3,540,477 | 11/1970 | Hogel | 235/201 ME |
| 3,593,734 | 7/1971 | Sanford | 235/201 ME |
| 3,603,705 | 9/1971 | Chandraratna | 137/608 X |
| 3,680,590 | 8/1972 | Helinski | 137/608 |
| 3,682,199 | 8/1972 | Bader | 235/201 ME |

Primary Examiner—Samuel Scott
Attorney—John A. Mawhinney

[57] ABSTRACT

A fluid logic circuit has a logic 'AND' function and utilises a plurality of valves which are operable between two conditions by fluid pressure inputs, representing logic inputs, presented to respective valve inlets for each valve, there being a common outlet to all the valves, the fluid pressure in which is controlled by the respective conditions of said valves, so that a fluid pressure representing a logic output is present at said outlet only when a fluid pressure is present at each inlet.

4 Claims, 2 Drawing Figures

FLUID LOGIC CIRCUIT

This invention relates to fluid logic circuits and is particularly concerned with a pneumatic logic circuit having a logic "AND" function.

It is an object of some embodiments of the invention to achieve a simple fluid-operable logic "AND" gate employing one or more simple fluid control valves.

According to the invention, a fluid logic circuit having a logic "AND" function comprises valve means provided with two or more inlets for receiving respective fluid pressure inputs corresponding to required logic input functions, an outlet arranged for presenting a fluid pressure output representing a logic output function, the valve means having a displaceable valve element being operable between a first condition in which a fluid pressure input is present at each inlet and a fluid pressure output corresponding to a fluid pressure input at one of said inlets is present at said outlet and a second condition in which a fluid pressure input is absent at the or each respective inlet apart from said one inlet, and no output is present at said outlet.

Preferably, said one inlet is directly connected to said outlet and there is provided a further outlet arranged for connection to an exhaust or low pressure supply, the valve means being arranged whereby in said second condition said one inlet is also connected to said further outlet and any fluid pressure input present at said one inlet is thereby dissipated and in said first condition said one inlet is disconnected from said further outlet and any fluid pressure present thereat is communicated directly to said outlet to provide a fluid pressure output.

Desirably, the valve element remains in said first condition as long as a fluid pressure input is present at the or each other inlet apart from said one inlet and passes into said second condition whenever a fluid pressure input is absent from the or each other inlet, it being unaffected by the pressure at said one inlet.

Conveniently, three or more inlets are employed and individual valve means are associated with all but said one inlet which is provided common to all of said individual valve means, there being provided one common outlet for presenting a fluid pressure output corresponding to the fluid pressure input at said one inlet whenever each individual valve means is in its first condition, no fluid pressure output being available when any one of said individual valve means is in its second condition.

Desirably, the or each individual valve means is biased into said second condition by spring means.

Conveniently, in the or each individual valve means the inlet for the fluid pressure input associated therewith is connected to said further outlet by a valve port and fluid control means are provided to determine whether a fluid pressure input or an exhaust or low pressure supply is connected to said valve port.

Desirably, said one inlet is connected to said common outlet for the or each individual valve means by a further valve port.

Preferably, the or each individual valve means comprises a piston-in-cylinder type valve with the piston taking the form of a resilient-lipped flap movable within the cylinder to define said first operative condition at which said valve port and said further valve port are disconnected, and distortable to connect said valve port and said further valve port whenever said exhaust or low pressure supply is connected to said valve port.

Alternatively, each individual valve means comprises a simple ball valve having a ball locatable on a conical seat to disconnect said valve port and said further valve port, and displaceable therefrom to connect said valve port and said further valve port whenever said exhaust or low pressure supply is connected to said valve port.

Preferably the fluid employed is air and the fluid logic circuit according to the invention comprises a pneumatic "AND" gate employing one or more pneumatic valves.

There now follows a description of some particular embodiments of the invention, by way of example only, with reference to the accompanying drawings, in which.

Figure 1:
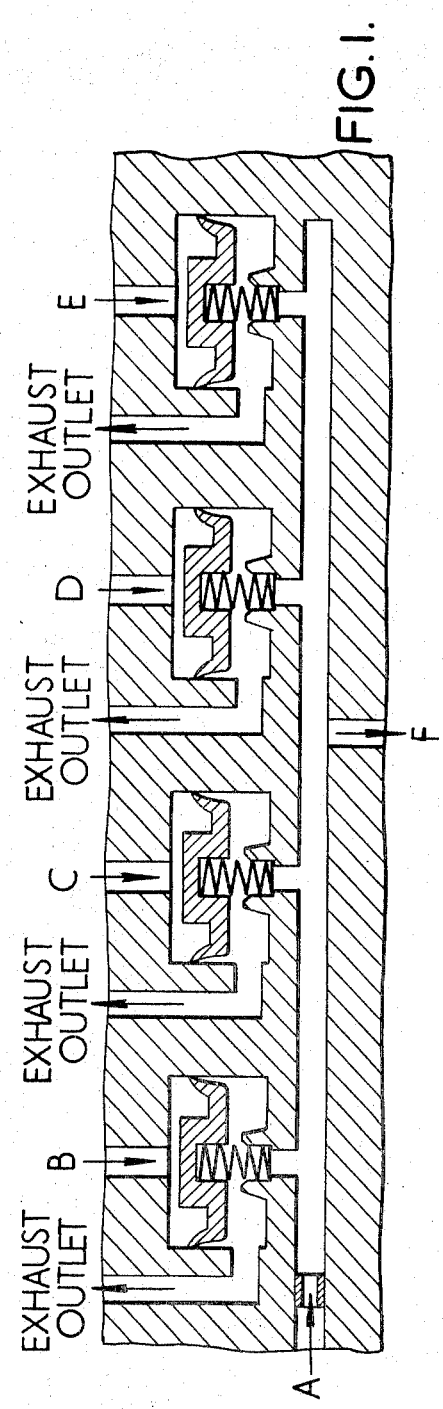
FIG. 1 shows diagrammatically a multiple input pneumatic "AND" gate employing one kind of piston-in-cylinder valve.
Figure 2:
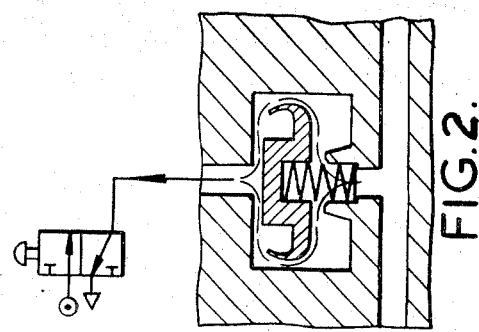
FIG. 2 shows diagrammatically an alternative valve for use in the multiple input pneumatic "AND" gate shown in FIG. 1.

The arrangements illustrated in FIGS. 1 and 2 provide a logic "AND" function and each arrangement constitutes a multiple input "AND" gate involving five individual fluid pressure inputs "A, B, C, D and E", corresponding respectively to individual logic input functions, and a single fluid pressure output 'F' corresponding to a logic output function or result. In symbolic logic term the arrangements obey the equation:

$$A \cdot B \cdot C \cdot D \cdot E = F$$

In these particular examples, the fluid employed is air and thus the various arrangements described constitute pneumatic logic circuits and, in particular, pneumatic multiple-input "AND" gates.

Referring to FIG. 1, four similar valves each with two inlets, are arranged in tandem, one inlet of each valve being connected to a source of fluid pressure input B, C, D or E associated with that valve and the other inlet of each valve being connected to a further source of fluid pressure input A which is common to all of the valves. Each valve is also provided with two outlets one of which is an "exhaust" outlet connected to an exhaust or low pressure supply. The other outlet is connected to the common inlet for fluid pressure input A and thereby constitutes a common outlet for a fluid pressure output F. Essentially, each valve includes a piston in the form of a resilient-lipped flap which is located within a cylinder so that the resilient peripheral lip of the flap bears against the walls of the cylinder and acts as a seal between the two inlets of valve. It will be apparent that each valve has two operative conditions, corresponding to the two extremities of the possible axial movement of the flap within the cylinder, and that at one of said operative conditions, in which the flap is uppermost as seen in FIG. 1, the inlet connected to the common fluid pressure input source A, communicates with the exhaust or low pressure reservoir through the "exhaust" outlet of the valve. In the second operative condition of the valve, with the flap in the lower position as seen with respect to FIG. 1, the fluid pressure input source A is not connected to the outlet and is available as a fluid pressure output F. FIG. 1 illustrates each valve in its second operative position.

FIG. 2 shows a similar arrangement to FIG. 1, with an equivalent logic multiple input "AND" gate action, and involving the four air pressure inputs B,C, D and E controllable by ball valves which are illustrated diagrammatically. One port of each of these valves serves either as an inlet or an outlet in that it can be connected by a control valve to an air pressure input source, as indicated by a solid headed arrow, or to an exhaust or low pressure supply, as indicated by the open headed arrow. The other port of each valve is connected to an inlet for the air pressure input A and to an outlet for presenting an air pressure output F. The situation illustrated in FIG. 2 is that air pressure inputs A, B, C and D are present but that air pressure input E is not present, the upper port of its respective ball valve being connected to an exhaust or low pressure supply. Consequently the air pressure input A passes through the ball valve associated with the air pressure input E to be dissipated in the exhaust or low pressure outlet and no significant air pressure output F appears. Conveniently, the air pressure output is then simply atmospheric pressure.

FIG. 3 shows an alternative valve arrangement to that employed in the valves illustrated in FIG. 1, the arrangement being such that each of two valve port serves either as an inlet or outlet (in similar manner to the two ports of the ball valves of FIG. 2). The upper valve port is connectable through an appropriate control valve to either an exhaust or low pressure supply or to an air pressure input source (such as B, C, D or E) corresponding to a desired input function. The lower valve port is connected to the common inlet and outlet tract. As with the valves of FIG. 1, the piston flap is biased into an upper position by a simple coil spring arrangement. If a fluid pressure input is absent from the upper valve port then any fluid pressure input A present at the lower valve ports distorts the resilient lip of the piston and passes through the upper valve port to an exhaust or low pressure supply. This is the situation illustrated in FIG. 3. If a fluid pressure input is present at the upper valve port then any fluid pressure input present at the lower valve port is available as a fluid pressure output.

It should be appreciated that the arrangements described have the advantage that they employ simple valves in tandem and that these valves may conveniently be proprietary units.

It will also be apparent that further logical functions may be built up by using the multiple input logic "AND" gates described, in various combinations and possibly with gates with other logic actions.

What I claim as my invention and desire to secure by Letters Patent of the United States is:

1. A fluid logic circuit having a logic 'AND' function with respect to at least two fluid pressure inputs, representing respective logic input functions, and a fluid pressure output, representing a logic output function, said circuit comprising a valve chamber, an exhaust or low pressure supply, a first valve port communicating with said valve chamber and alternatively connectable to one of said fluid pressure inputs or to a said exhaust, a second valve port communicating with said valve chamber and connected to another of said fluid pressure inputs, an outlet communicating with said second valve port to present said fluid pressure output, and a resilient lipped valve element positioned within said valve chamber intermediate said first and second valve ports and operable, by the connection of said one fluid pressure input to said first valve port, into a first condition, in which said first and second valve ports are sealed one from another and said other fluid pressure input is presented at said outlet as a fluid pressure output, and, by the connection of said exhaust to said first valve port, into a second condition in which said resilient lip is distorted to interconnect said first and second valve ports, whereby said other fluid pressure input, if present, is dissipated and no fluid pressure output is presented at said outlet.

2. A fluid logic circuit, as claimed in claim 1, wherein three or more inlets are employed and individual valve means are associated with all but said one inlet which is provided common to all of said individual valve means, there being provided one common outlet for presenting a fluid pressure output corresponding to the fluid pressure input at said one inlet whenever each individual valve means is in its first condition, no fluid pressure output being available when any of said individual valve means is in its second condition.

3. A fluid logic circuit, as claimed in claim 1, wherein spring means is provided for each individual valve means to bias it into its said second condition.

4. A fluid logic circuit, as claimed in claim 1, wherein the fluid employed is air and the fluid logic circuit according to the invention comprises a pneumatic 'AND' gate employing one or more pneumatic valves.

* * * * *